United States Patent [19]

Yapp

[11] 3,912,690

[45] Oct. 14, 1975

[54] METHOD FOR PRODUCING A SHELLAC SUBSTITUTE AND PRODUCT
[75] Inventor: William J. Yapp, Park Forest, Ill.
[73] Assignee: The Sherwin-Williams Co., Cleveland, Ohio
[22] Filed: Nov. 5, 1970
[21] Appl. No.: 87,314

[52] U.S. Cl. ............................................. 260/75 EP
[51] Int. Cl.[2] ......................................... C08G 63/12
[58] Field of Search ................................ 260/75 EP

[56] References Cited
UNITED STATES PATENTS
3,089,863  5/1963  Hicks et al. ............................ 260/75
3,355,434  11/1967  Milligan et al. ........................ 260/75

Primary Examiner—Melvin I. Marquis
Assistant Examiner—W. C. Danison, Jr.
Attorney, Agent, or Firm—James V. Tura; Richard G. Smith

[57] ABSTRACT

Alcohol soluble polymeric sealant vehicles are produced synthetically by reaction of a polyol having at least three reactive hydroxyl groups with at least one aromatic acid anhydride, the latter class in not more than stoichiometric relation to the hydroxyls of the polyol, opening the anhydride ring thereof by partial esterification without water formation at temperatures below the esterification range. Thereafter, free carboxyl groups then present are predominantly esterified by further reaction with at least one epoxide monomer preferably having both an epoxy group and another functional group. The latter epoxide combination most often includes as a part thereof reactant monomers containing as the sole functional group one epoxide group, monomers containing two epoxide groups, and monomers containing an epoxide group and a reactive hydroxyl group. In any event, selection and stoichiometric relation of the reactants in the final polymer are such that the final unreacted hydroxyl percent by weight of the completed polymer is at least eight percent to provide requisite alcohol solubility. These polymers are further unusual in that they are of relatively uniform and pre-calculatable molecular weight.

2 Claims, No Drawings

METHOD FOR PRODUCING A SHELLAC SUBSTITUTE AND PRODUCT

This invention is concerned with the production of improved sealing compositions having the functional capabilities of shellac, being soluble in lower aliphatic alcohols and particularly methyl and ethyl alcohol, here intended by the term "spirit soluble".

A study of commercial liquid sealants reveals natural shellac cut in alcohol to be the principal survivor. Shellac cuts have been used for purposes of priming porous surfaces to prevent penetration thereinto by subsequent coatings of liquid protective and decorative coatings, to provide a means of preventing "raising" of wood grain in fine finishing operations, as a sanding sealer, to prevent bleeding colors from migrating from sub-surfaces into subsequently applied decorative coatings, and a wide multitude of uses where synthetic products have failed to provide the natural advantages of shellac cuts.

A primary object of this invention is to provide a synthetic polymer, soluble in the lower aliphatic alcohols but substantially insoluble in the more usual "mineral spirits" and other aliphatic hydrocarbons which are standardly used in protective and decorative coatings. Products are generally somewhat more soluble in aromatic hydrocarbons, however, than aliphatic ones.

Another object is to provide an alcohol soluble synthetic polymer having excellent sealing properties which are controllable through control of the final molecular weight and molecular weight distribution in the design of the polymeric structure thereof. A minimum number average molecular weight of 1,000 or above is considered essential to obtain practical sealant properties.

Still another principal objective is to overcome the many inherent problems in dependency on a natural product, such as shellac, which varies in available quantity, dependable quality and performance with age when in the liquid stage.

Polyester polymeric products and methods for their manufacture are widely used in the protective and decorative coatings art. Oil modified polyesters or oil modified alkyds have been developed and continue to be improved, though the basic concepts can be traced to pre-world war I dates.

While the novel products of this invention are identified by ester linkages between component monomeric reactants, their origin cannot take place through the more usual polyhydric alcoholpolycarboxylic esterifications widely used in the art at temperatures above about 300°F. and more usually 420°–525°C. The products of this invention would not be made by prior art esterifications at the foregoing temperatures because of the high degree of reactivity of the large number of groups terminating the branched chains containing reactive H atoms. Under usual esterification conditions, gelation and insolubility occur before polymerization could be advanced to a suitable molecular weight level.

According to the present invention, a two-stage process is developed, each stage of which provides options for variation in the molecular structure ultimately developed in the final polymer.

The ability of those skilled in the polymer arts can be brought into play to devise a variety of structures, each having the quality of providing the sealing qualities of natural lac but improvement thereover in a variety of other qualities heretofore mentioned, as well as to maintain solubility in lower aliphatic alcohols and insolubility in, for example, mineral spirits commonly a solvent for dyes and other coatings.

The first stage of development of the polymers of this invention involves opening the anhydride ring of one or more aromatic acid anhydrides with a polyol containing at least three reactive hydroxyl groups. It is important for purposes of this invention that the total number of anhydride rings of the anhydride monomer be not more than stoichiometrically equivalent to the total hydroxyl groups in the polyol reactant. This reaction is carried out at less than 300°F. and preferably about 250°F. in the presence of a catalyst such as zirconium isodecanote, and an unreactive solvent, for example, methyl isobutyl ketone.

While a solvent carrier for the reaction is not an absolute essential, and fusion reactions can be carried out, it is more difficult. Uses of solvents, unreactive in the system, are well known.

The most simple, but less preferred reactants could embrace phthalic anhydride and glycerine as the sole initial reactants. However, greater functionality of the polyol is preferred and pentaerythritol, dipentaerythritol and polypentaerythritol are preferred polyol choices.

Also, superior products result if at least a part of the original acid anhydride is of a functionality greater than two. It has been found that trimellitic anhydride can be used in whole, or in part, for phthalic anhydride and other aromatic acid anhydrides including pyromellitic dianhydride can also be substituted therefor. Also useful are cyclic aliphatic anhydrides including alpha (2 carboxyethyl) glutaric anhydride and 2 carboxyethyl succinic anhydride can be substituted in part for the example illustrating use of the less costly and more readily available phthalic anhydride reactant.

The first stage reaction occurs quite completely under the foregoing conditions in from about one to about four hours and can be followed by plotting acid value against time at a preselected temperature for optimum reaction period.

The second stage of the reaction primarily (with minor exceptions) provides control of the terminal groups or branched chains which must be relatively high in weight percent of hydrogen bonding groups, normally hydroxyl and carboxyl groups. In order to obtain practical ethanol solubility of the resultant polymer, it has been found that the weight percent of hydroxyl group in the final polymer should be of the order of 8 weight percent or greater.

The weight percent hydroxyl is calculated for the purposes of this invention in a special way to compensate for carboxyl groups present, although it has been found from practical experience that the solubility parameter of the final polymer is not appreciably shifted in value by the carboxyl groups which may be present as such, or reacted in accordance with the suggestions for their compensation in the following illustrative calculations.

The weight percent hydroxyl as used herein is calculated by adding the total weight equivalence of hydroxyl groups in the initial monomer plus the carboxyl groups present times 17 divided by the total charge weight in grams of the reactants in the initial stage plus the theoretical amount in grams of propylene oxide essential to give a zero acid value to the final polymer times 100. (Note: this may or may not be followed practically, though often it is done.)

In a preferred second stage of the reaction, a reaction mixture is previously prepared by blending of epoxide monomers to include epoxidized dicyclopentadiene monohydrate (an epoxide monomer having a second functional group containing a reactive hydrogen atom—here a hydroxyl group), also 4-oxytetracyclo 6.2.1.0$^{2,7}$0$^{3,5}$ undecan 9(10) ol. 3,4 epoxy cyclohexyl methyl 3,4 epoxy cyclohexane carboxylate (a di-epoxide, whose principal value is to extend the basic polymer chain and to increase the molecular weight of the final polymer to meet the particular requirements of the sealant problem to be met) and propylene oxide which is preferably used in such quantity as to assist in producing the most economical polymer capable of meeting the requirements of the end use. As propylene oxide is quite volatile, adjustments for losses in processing are contemplated.

The blend of epoxides is added slowly over a period of from one to four hours to yield, by reaction with the carboxyl groups, further complex esters and a free hydroxyl group for each epoxide group present. Each may also be added separately.

Alternatively, the polyfunctional epoxide monomers may be added singly and stepwise, preferably holding any difunctional epoxide for the last addition.

It is in the second stage reaction that principal control of the final weight percent of hydroxyl group is attained. Illustratively, if a polymer is produced by the foregoing steps where one mol of pentaerythritol and four mols of phthalic anhydride are reacted in the first stage and four mols of propylene oxide are used as the sole epoxide monomer, the theoretical weight percent hydroxyl content is about 7 percent. The polymer so produced is insoluble in ethyl alcohol.

However, if one reproduces the first stage reaction using the ratios of pentaerythritol and phthalic anhydride as above, but substitutes four mols of epoxidized dicyclopentadiene monohydrate as the epoxide monomer, the theoretical hydroxyl content weight percent becomes 9.8 percent and the product can be cut in ethanol to produce a synthetic shellac cut for sealant purposes.

From the above, it becomes clear that the two stage process allows alternative formulation to produce a variety of alcohol soluble synthetic polymers of predetermined molecular weight depending upon choices of polyol having at least three reactive hydroxyls, upon choice of anhydride which may vary from a sole single ring aromatic monoanhydride devoid of other functional groups through those having additional functional groups including as illustrative but not limiting trimellitic anhydride, pyromellitic dianhydride, hydroxy phthalic anhydride, tetrahydro phthalic anhydride, endomethylene tetrahydrophthalic anhydride, hexachloroendomethylene phthalic anhydride, etc. As partial substitutes for the above anhydrides, it is also advantageous in meeting some formulation problems, for more specific end uses, to use other aliphatic anhydrides including maleic anhydride, succinic anhydride, glutaric anhydride, etc.

If one uses a single anhydride aromatic acid such as phthalic anhydride, it is essential to balance out the formula to obtain the eight or more weight percent of hydroxyl by use of an epoxide of greater functionality, e.g. glycidol.

However, if the initial anhydride monomer selected is trimellitic acid, for example, then a single epoxide group containing monomer will be useful to produce products within the scope of the invention. Propylene oxide can be used as the sole epoxide group in such case.

The epoxide monomer, as has already been suggested, can embrace a large number of individual epoxides, preferably those having an additional functional group to the essential epoxide group. Ethylene oxide has the disadvantages of requiring pressure reactors but the higher analogues including propylene oxide, butylene oxide and styrene oxide offer intriguing modifications preferably as a proportion of the epoxide monomer.

For purposes of alcohol solubility, it is preferable to use epoxides having as an additional functional group to the epoxide itself, a substituent having a reactive hydrogen group, glycidol being a simple but expensive illustration. Trimethylol propane oxetane has been found useful, but efforts using epoxidized dicyclopentadiene monohydrate and 3,4 epoxy cyclohexylmethyl 3,4 epoxy cyclohexane carboxylate in combination with minor proportions of propylene and/or butylene oxide have produced products having immediate commercial demand and provide interesting variants for sealer end uses where alcohol solubility and petroleum solvent insolubility are pre-requisites.

Where the functionality of the reactants are greater than three, for example when the reactant molecule selected contains two carboxylic acid anhydrides or two epoxide groups cross-linking in the reaction can cause gelation. In such instances if the amount of such reactant is kept below one mol for every two mols of polyol, the gelation can be overcome.

The preparation of polymeric products useful in coating compositions involving reactions of organic acid anhydrides and oxirane compounds have been described in the prior art and to avoid repetition of what the state of the art is as of the date hereof, U.S. patents of Hayes, U.S. Pat. No. 3,779,783; and Hicks and Masters, U.S. Pat. No. 3,089,863, 3,376,271 and 3,376,273; and Hoy U.S. Pat. Nos. 3,417,034 and 3,440,192 are incorporated in full herein by reference. However, the foregoing prior art has not been concerned with production of alcohol soluble shellac substitutes, but discloses broadly reactions and theory useful to the practice of the present invention. Lists of useful monomers, some of which are useful for the present invention, may be helpful to understanding the full scope of the present invention may be found in the prior art here of record. Other patents of which the art is aware include U.S. Pat. No. 3,355,434 of Milligan and Waddill and British Pat. No. 1,101,247.

The following examples, while not exhaustive, are illustrative of the best mode known to practice the invention as of the date of filing hereof. Inasmuch as the foregoing concepts open many permutations and combinations of reaction of components herein illustrated, combined in accordance with the general principals of the illustrative examples, we believe that it is clear to those skilled in the art that examples other than the following will find outstanding utility in a variety of protective and decorative coatings end uses. While the principal objective has been to produce an ethanol soluble product having enhanced characteristics over shellac, it is obvious that the high sealant qualities and alcohol solubility qualities of the synthetic product provide a dominant suggestion for further exploration of the ramifications of the invention herein disclosed and claimed.

EXAMPLE 1

Glycerine (276) gms.), phthalic anhydride (1,332 gms.), and methyl isobutyl ketone (402 gms., as a processing solvent) were charged in a five liter flask equipped with a reflux condenser and a separatory funnel. The charge was heated to 250°F. for 1 hour. A mixture of 972 gms. of epoxidized dicyclopentadiene monohydrate (Unox 1222-Union Carbide Company) and 11.6 gms. of 6% zirconium isodecanoate was added and held at 250°F. for 1 hour. 174 gms. of propylene oxide was then added over a period of 6½ hours. The cook was then cut in 1,056 g. of n-propanol and displayed a xylene reducibility of approximately 75% (reduction to 33% NVM) and an ethanol reducibility of over 3,000% (less than 2% NVM). A film cast on glass was clear and hard. The NVM was 60% and the A.V. was 42. The theoretical hydroxyl content was calculated to be 9.25% weight percent of the polymer.

EXAMPLE 2

A three liter flask equipped with a reflux condenser, separatory funnel and thermometer was loaded with 136 parts pentaerythritol, 592 parts phthalic anhydride, 5 parts of a 20 weight percent solution of zirconium isodecanoate (as catalyst) and 200 parts methyl isobutyl ketone as processing solvent.

The charge was heated to 250°F. and held at this temperature for about three hours to open the acid anhydride ring. No appreciable water was evolved. Thus, the first stage of the reaction to produce the half ester of the phthalic with one of the hydroxyls of the pentaerythritol was completed.

A mixture was prepared using 305 parts epoxidized dicyclo pentadiene monohydrate (Polycyclol 1222), (a product of Union Carbide), 77 parts propylene oxide and 58.5 parts 3,4 epoxy cyclohexyl methyl 3,4 epoxy cyclohexane carboxylate (ERL 4221, a product of Union Carbide).

The mixture was added very slowly in dropwise fashion over a 3¼ hour interval, the temperature being held close to 250°F. The reaction is exothermic and often no additional heating is required.

It was found that the resultant polymer could be reduced to 15% weight solids before cloudiness, a first indication of insolubility, can be observed. Often upon standing cloudiness will disappear.

The theoretical hydroxyl value of the final product is 8.3% by weight.

EXAMPLE 3

Into a stainless steel pilot plant of 300 gallons capacity were charged 98.5 parts pentaerythritol, 320 parts phthalic anhydride and 145 parts methyl isobutyl ketone. Inert gas at about five cubic feet per minute were passed through the kettle. The temperature of the reactants was increased to 250°F. and held for one hour upon good agitation. Add 141 parts epoxidized dicyclopentadiene monohydrate and hold for one hour. Propylene oxide is bled into the reaction zone at the rate of 16 parts/hr. or as reflux allows. No inert gas was used. After 60 parts had been added, hold at about 250° until reflux stops. The acid value is checked. If acid value is greater than 132, an additional five parts of propylene oxide are added over a half-hour period and held for a half-hour.

If the acid value checks out between 132 and about 80, continue the polymerization by adding 44 parts of 3,4 epoxy cyclohexyl methyl 3,4 epoxy cyclohexane carboxylate (ERL 4221). Hold for an additional half-hour at not more than about 250°F. and drop into 521 parts ethanol to produce about 50% non-volatile polymer solution. The polymer solids or non-volatile calculate to be 10.3 weight % of hydroxyl group.

The final alcohol soluble vehicle was formulated into an intercoat sealer for automotive end use. It was also found to be useful as an intercoat sealer for acrylic modified alkyd enamels. Additionally, the product proved useful as a sealant or gasket dope on motor oil containers where exposure to mineral (motor) oils occur. Parts are by weight unless otherwise specified.

EXAMPLE 4

A 5 liter flask, equipped with a reflux condenser and a separatory funnel, was charged with 276 gms. of glycerine, 1332 gms. of phthalic anhydride and 402 gms. of methyl isobutyl ketone (a processing solvent). This charge was heated to 250°F. and held for one hour. 11.6 gms of 6% zirconium isodecanoate (as in Example 1) and 486 gms. of epoxidized dicyclopentadiene monohydrate were added and held for ½ hour, at which point another 486 gms. of the monohydrate were added and the batch held at 250°F. for 1 hour. Then, 139 g. of propylene oxide was added dropwise over a 6½ hour period. When this addition was complete, 204 gms. of diglycidyl bisphenol-A (Shell Epon 828) was added. After 1 hour at 250°F., the cook was cut in 1554 g. of ethanol 95%. The final product had an NVM of 60%, an A.V. of 72, an ethanol reducibility of 2500% and a xylene reducibility of 250%. A 1/10 mil film was clear and hard, and was dry to touch in less than one minute. The theoretical hydroxyl content calculates out to be 8.7% by weight of the polymer.

EXAMPLE 5

81.5 gms of pentaerythritol, 102 gms. of dipentaerythritol, 252 gms. of phthalic anhydride, 326 gms. of trimellitic anhydride, 5 ml. of triethylamine (catalyst) and 200 gms. of methyl isobutyl ketone (a processing solvent) were charged in a five liter flask equipped with a reflux condenser and a separatory funnel. The charge was heated to 250°F. and held for one hour, yielding a white doughy mass. A mixture of 296 gms. of propylene oxide and 48 gms. of 3,4 epoxycyclohexylmethyl 3,4 epoxy cyclohexane carboxylate was then added dropwise over a period of four hours and 40 minutes. After completion of this addition, the cook was cut in 400 gms. of ethanol. The final product had an NVM of 70, an A.V. of 146, an ethanol reducibility greater than 3,000% and a xylene reducibility less than 100%. A 1/10 mil film was clear, hard, and dry to touch in about four minutes. The theoretical weight percent of hydroxyl was 10.6%.

EXAMPLE 6

A 3 liter flask, with a reflux condenser and a separatory funnel, was charged with 136 gms. of pentaerythritol, 222 gms. of phthalic anhydride, 288 gms. of trimellitic anhydride, 58.5 gms. of 3,4 epoxycyclohexyl methyl 3,4 epoxy cyclohexane carboxylate, 5 ml. of triethylamine, and 200 gms of methyl isobutyl ketone as a processing solvent. This charge was heated to 250°F. and held for 40 minutes, to accomplish the first half ester reaction. Then 261 gms. of propylene oxide was added dropwise over a 4 hour and 20 minute period, to complete the esterification. The product was cut in 400 ml. of anhydrous ethyl alcohol, producing a cloudy solution, which cleared on standing. The final product had an NVM of 66%, an A.V. of 97, an ethanol reducibility > 3000%, and a xylene reducibility of 150%. A 1/10 mil film dried clear hard in less than 20 minutes. The theoretical weight percent of hydroxyl was 9.7%.

EXAMPLE 7

Tests were run comparing the product of Example 3 with a pure white 3 pound cut of shellac. Ratings are on the basis of one (1) being best and poorer in ascending numerical order.

| Drying (On Glass) | Example 3 | Shellac |
|---|---|---|
| a) Dry to touch | 20' | 35' |
| b) Leveling | 1 | 2 |
| c) Pencil hardness | HB | Very soft |
| d) Mar resistance | 3(Pass) | 3(Pass) |
| Drying (On Maplewood) | | |
| a) dry to touch | 13' | 40' |
| b) tack free time | 60' | 70' |
| c) brushability | 1 | 1 |
| Recoatability | | |
| a) lifting | Pass | Pass |
| b) crawling | 1 | 1 |
| c) film quality (appearance) | 2 | 1 |
| d) gloss | 1 | 2 |
| e) brushing quality | 1 | 2 |
| General Qualities | | |
| a) Mar resistance | 3 | 1 |
| b) Sanding | 2 | 3 |
| c) Impact resistance (on tin) | 2 | 3 |
| d) Six months stain sealing | Pass | Fail |
| (Kem Glo over red stain sealed with the products identified) | | (Red Bleed) |

A summary of known useful monomers for the purposes of this invention is set out as follows: Aromatic acid dianhydrides, pyromellitic dianhydride, benzophenone dianhydride, etc. Aromatic acid anhydrides, phthalic anhydride, trimellitic acid, etc.; Cyclic aliphatic anhydrides, tetrahydrophthalic anhydride, hexahydrophthalic anhydride, maleic anhydride, succinic anhydride, glutaric anhydride, etc; Monoepoxides, ethylene oxide, propylene oxide, butylene oxide, α pinene oxide, phenyl glycidyl ether, vinyl cyclohexene monoxide, styrene monoxide, etc.; Diepoxides, butylene dioxide, dicyclopentadiene dioxide, 3,4 epoxy cyclohexyl methyl 3,4 epoxy cyclohexane carboxylate, etc.; Epoxides with hydroxyl functionality; glycidol and epoxidized dicyclopentadiene monohydrate.

A particular outstanding utility of products of the nature disclosed in the foregoing exposition is for a barrier or sealer coat in refinishing aged automotive finishes. Due to weathering, the original coat does not provide an appropriate base coat. It has been found that the products of this invention when applied as an intermediate coating between the weathered finish and the new coating compositions, provide excellent intercoat adhesion and prevent transmission of the incipient failures of the base coat, for example, cracking and brittleness to the new top coating. Spirit solubility (e.g. in lower aliphatic alcohols) is almost mandatory in the foregoing use.

Molecular weight of the final polymer is determined by the initial mols of polyol present where the oxirane monomer and the anhydride have only a single epoxide or anhydride group. In those cases where the oxirane monomer contain two epoxy groups or two anhydride groups, the mols are subtracted from the mols of polyol present. Division of the total charge of the reactants by the resultant figure provides the molecular weight of the final polymer. Example 3, therefore, has a molecular weight of about 1200.

The foregoing examples illustrate the best mode presently known to practice the process and to produce alcohol soluble polymers of controlled molecular weight. Heretofore, products of such extensive branching having terminal groups containing reactive H groups (e.g., hydroxyl and carboxyl) could not be produced without gelation prior to completion of the ester formation as herein provided.

Having described and illustrated the practice of my invention, I claim:

1. A method for preparing a polyester resin soluble in lower aliphatic alcohols which comprises (a) reacting at temperatures ranging from about 175°F and below 300°F phthalic anhydride with pentaerythritol; the total quantity of anhydride being not more than stoichiometrically equivalent to the hydroxyl groups of the pentaerythritol; maintaining the reaction temperature above about 175°F and below 300°F for sufficient time to half-esterify said anhydride to form the half-ester and (b) subsequently reacting said half-ester with at least two oxirane monomers having terminal epoxide groups; the major proportion of said oxirane monomers being propylene oxide with the other oxirane monomer containing a hydroxyl group; maintaining the reaction conditions for a time sufficient to esterify the carboxyl groups with said epoxide groups and selecting the quantities of reactants such that the hydroxyl content of the polyester resin is at least 8% by weight thereof.

2. The polyester resin obtained by the process of claim 1.

* * * * *